US006603516B1

(12) United States Patent
Fujiwara et al.

(10) Patent No.: US 6,603,516 B1
(45) Date of Patent: Aug. 5, 2003

(54) IMAGE DISPLAY APPARATUS

(75) Inventors: Shuichi Fujiwara, Suwa (JP); Shoichi Akaiwa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/403,808

(22) PCT Filed: Feb. 24, 1999

(86) PCT No.: PCT/JP99/00863

§ 371 (c)(1), (2), (4) Date: Jan. 3, 2000

(87) PCT Pub. No.: WO99/44190

PCT Pub. Date: Sep. 2, 1999

(30) Foreign Application Priority Data

Feb. 26, 1998 (JP) .......................................... 10-046045

(51) Int. Cl.$^{7}$ ................................................. H04N 5/46
(52) U.S. Cl. ....................................... 348/558; 348/563
(58) Field of Search ................................ 348/553, 554, 348/555, 556, 558, 465, 468, 563, 569; 345/699; H04N 5/46

(56) References Cited

U.S. PATENT DOCUMENTS 5,486,868 A * 1/1996 Shyn et al. ................. 348/524
5,559,560 A * 9/1996 Lee ............................ 348/465
5,767,917 A * 6/1998 Gornstein et al. .......... 348/543
5,812,210 A * 9/1998 Arai et al. .................. 348/555

OTHER PUBLICATIONS

"Electronic Display", Ohm Co., Ltd., p. 291, line 14—p. 294, line 6, published Jul. 7, 1995 and an English–language translation thereof.

* cited by examiner

*Primary Examiner*—Michael H. Lee
(74) *Attorney, Agent, or Firm*—Oliff & Berridge, PLC

(57) ABSTRACT

An image display apparatus is provided that can easily confirm whether an image signal is suitable to the setting of an image display unit. The image display apparatus may include an image input unit, where image signals are input, an image display unit forming an optical image on the basis of the input image signals, a signal information detector for detecting signal information of the input image signals according to an input system of the image input unit, and a signal information output unit for outputting signal information detected by this signal information detector. Since the image display apparatus includes the signal information detector and the signal information output unit, it is possible to easily confirm whether the input image signals are suitable to the setting of the image display unit.

30 Claims, 4 Drawing Sheets

IMAGE DISPLAY APPARATUS

BACKGROUND OF THE INVENTION

1. Field of the Invention

The present invention relates to an image display apparatus comprising an image input unit, where an image signal is input, and an image display unit forming an optical image on the basis of the image signal input from this image input unit.

2. Description of the Related Art

Until now, an image display apparatus is used, the apparatus that comprises an image input unit to which an image signal is input, and an image display unit forming an optical image on the basis of an image signal input from this image input unit. It is possible to display an image signal from a computer and the like on a large screen such as a projection screen by connecting the computer, a video tape recorder, and the like to the image input unit of such an image display apparatus. Therefore, it is possible to efficiently construct a multimedia presentation system using a computer.

Here, in order to make it possible to perform presentation using various media, the image input unit of the image display apparatus is constructed so that different kinds of signals such as a computer image signal and a video image signal can be input. In an input line of each image signal, a dedicated circuit is provided, and owing to this, it is possible to form an optical image on the image display unit according to a kind of the image signal.

Nevertheless, even if an image signal is one that is input from the same input line, the signal information of the image signal is sometimes different from others. Thus, if the image signal is one that is output from a computer, signal information such as resolution, and horizontal and vertical synchronization frequencies may be different in some cases according to the setting and kind of the computer. In addition, if the image signal is a video image signal, signal information regarding a television system such as the NTSC system, PAL system, and SECAM system may be different in some cases.

On the other hand, the image display unit of the image display apparatus is set at values that makes it possible to correspond to predetermined signal information. A conventional image display apparatus cannot output signal information of an image signal, which is input, to an external device and the like, and hence the apparatus has a problem that it is difficult for a presenter (a user of the image display apparatus) to immediately judge whether the image signal is suitable to the setting of the image display unit. In particular, if the image signal is one that is output from a computer, there is a problem that, since it is not possible to judge the signal information such as resolution and the like so long as a user does not actually confirms the setting of the computer, it takes labor.

An object of the present invention is to provide an image display apparatus, which makes it possible for a user of the image display apparatus to easily confirm whether an image signal is suitable to the setting of an image display unit, among image display apparatuses each of which comprises an image input unit, where an image signal is input, and an image display unit forming an optical image on the basis of the image signal input from this image input unit.

SUMMARY OF THE INVENTION

In order to achieve the above object, an image display apparatus according to the present invention is an image display apparatus that comprises an image input unit, where image is input, and an image display unit forming an optical image on the basis of the image signal input from this image input unit, and may include a signal information detector for detecting signal information of the image signal according to an input line of the image input unit, and a signal information output unit for outputting the signal information, detected by this signal information detector, to a device.

Here, it is conceivable that "signal information of an image signal according to an input line" is, for example, signal information including resolution such as VGA, SVGA, XGA, and SXGA and a refresh rate, sync polarity, a sync mode, and frequencies in case of an RGB signal output from the computer described above. On the other hand, if the image signal is a composite signal from a video camera and the like, it is conceivable that "signal information of an image signal according to an input line" is signal information regarding a television system, for example, it is conceivable to detect as signal information what system an image signal input is based on among the NTSC, PAL, and SECAM systems.

Furthermore, it is conceivable that the device described above is, for example, an image display unit constructing an image display apparatus, an indicator such as an LED that is provided in an image display apparatus, a computer being connected to an image display apparatus and outputting an image signal, or the like.

According to the present invention like this, since the image display apparatus comprises the signal information detection unit and the signal information output unit, a user of the image display apparatus can easily confirm whether an image signal is suitable to the setting of the image display unit, by detecting signal information of the image signal input and outputting the signal information to a specific device.

In addition, if an image signal is an RGB signal output from a computer, it is possible to compare resolution displayable on the image display unit with resolution of the image signal, which is input, if signal information includes the resolution of the RGB signal. Therefore, it is possible to adjust the RGB signal at the resolution suitable to the image display unit, and hence it is possible to dissolve such a state that the RGB signal having unnecessarily high resolution is output from the computer.

Hereinabove, it is preferable that, if the image signal input from the image input unit is an RGB signal, the signal information described above is constructed with including information on the number of colors of this RGB signal.

Thus, the number of colors which the image display unit can handle is also limited, and hence, if the signal information includes the information on the number of colors of an image signal, similarly to the resolution, it is possible to set the RGB signal at the suitable number of colors which is displayable in the image display unit. Hence, it is possible to dissolve such a state that the RGB signal for which unnecessarily many colors are set is output from the computer.

In addition, it is preferable that the image display apparatus described above comprises determination unit for performing comparative judgment of setting information, corresponding to the signal information of the image display unit, with the signal information, and that the signal information output unit described above outputs the result of comparative judgment by this determination unit with the signal information.

Thus, since the image display unit comprises the determination unit, it is possible to automatically judge whether an image signal is suitable to the setting of the image display unit and to output this judgment result by the signal information output unit. Therefore, it is possible to further easily confirm whether the image signal is suitable to the setting of the image display unit.

Furthermore, it is conceivable that the device to which the signal information output units described above outputs signal information is a computer, which is connected to an image display apparatus and outputs an image signal, or an image display unit constructing an image display apparatus.

So long as the device to which the signal information is output is a computer, it is possible to immediately adjust an image signal, output from the computer, so that the image signal may be suitable to the setting of the image display unit if the image signal is not suitable to the setting of the image display unit. In addition, if the device to which the signal information is output is an image display unit constructing an image display apparatus, it is possible to confirm at the same time of the startup of the image display apparatus whether an image signal is suitable to the setting of the image display unit.

DESCRIPTION OF THE PREFERRED EMBODIMENTS

An embodiment of the present invention that is shown in drawings will be described in greater detail with reference to the embodiment shown in drawings.

Figure 1:
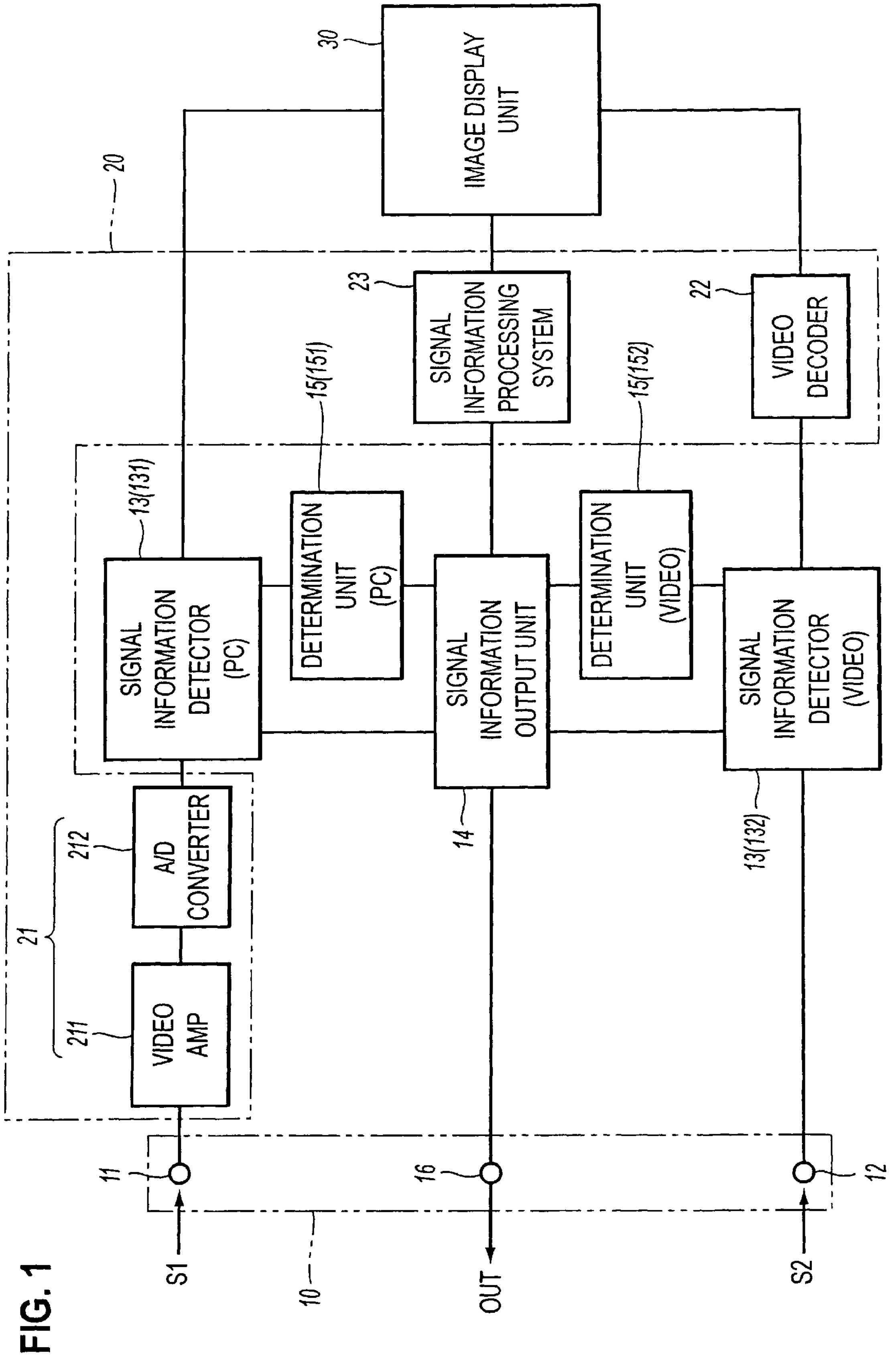
FIG. 1 is a block diagram showing the structure of an image display apparatus according to an embodiment of the present invention.

FIG. 1 is a block diagram showing the structure of a projection image display apparatus 1 that is an image display apparatus according to an embodiment of the present invention.

An image display apparatus 1 is constructed with including an image input unit 10, to which a computer, a video tape recorder, and the like that are not shown are connected, a signal processing unit 20, converting an image signal input to the image input unit 10, and an image display unit 30 forming an optical image from the image signal converted in the image processing unit 20.

The image input unit 10 comprises an RGB input terminal 11 receiving an RGB signal S1 output from a computer, and a video input terminal 12 receiving a composite signal S2 output from a video tape recorder. Respective signal information detection means (signal information detector) 13 are provided according to input lines of image signals S1 and S2 between this image input unit 10 and image display unit 30. Signal information output means (signal information output unit) 14 is connected to this signal information detection means 13 so as to perform device-output of the signal information detected. Furthermore, judging means determination unit 15 for performing comparative judgment of the signal information, which is detected, with the setting information of the image display unit 30 is connected to the signal information detection means 13.

The signal information detection means 13 comprises PC signal information detection means (PC signal information detector) 131, located in an input line of the RGB signal S1, and video signal information detection means (video signal information detector) 132 located in an input line of the composite signal S2. Thus, the PC signal information detection means 131 detects the signal information of the RGB signal S1 input from the RGB input terminal 11, and the video signal information detection means 132 detects the signal information of the composite signal S2 input from the video input terminal 12. Known circuits that can detect the signal information according to image signals S1 and S2 are adopted in these signal information detection means 131 and 132.

If, for example, the RGB signal S1 is input from the RGB input terminal 11, the resolution and refresh rate, sync polarity, sync mode, and frequencies of the RGB signal S1 are detected as the signal information. In addition, if the composite signal S2 is input from the video terminal 12, it is detected as the signal information what system the composite signal S2 is based on among the NTSC, PAL, and SECAM systems.

Signal information output means 14 outputs the signal information, detected by the signal information detection means 13, to various devices, is connected to the image display unit 30 through signal information processing system 23 described later, and is also connected to an output terminal 16 so as to output the signal information, which is detected, from the image display apparatus 1 to a computer and the like. The judging means 15 performs comparative judgment of the signal information, which is detected, with the setting information of the image display unit 30. If the decision means 15 judges that the signal information of the image signal is different from the setting information of the image display unit 30 and hence the image signal is not suitable to the image display unit 30, the decision means 15 outputs a judgment signal, showing that the image signal is not suitable, to the signal information output means 14. Furthermore, the signal information output means 14 outputs this judgment signal with the signal information detected. In addition, the setting information of the image display unit 30 is stored in a memory area, which is not shown, of this decision means 15, and is sequentially called at the time of judgment by the decision means 15.

The signal processing unit 20 is constructed with including an RGB signal processing system 21, a video decoder 22, and a signal processing system 23. The RGB signal processing system 21 is composed of a video amplifier 211 amplifying the RGB signal S1, and an A/D converter 212 performing A/D conversion of the RGB signal S1 amplified, and is located between the RGB input terminal 11 and RGB signal information detection means 131. On the other hand, the video decoder 22 decodes the composite signal S2 input from the video input terminal 12, converts the composite signal S2 into a digital RGB signal, and is located between the video signal information detection means 132 described above, and image display unit 30.

Figure 2:
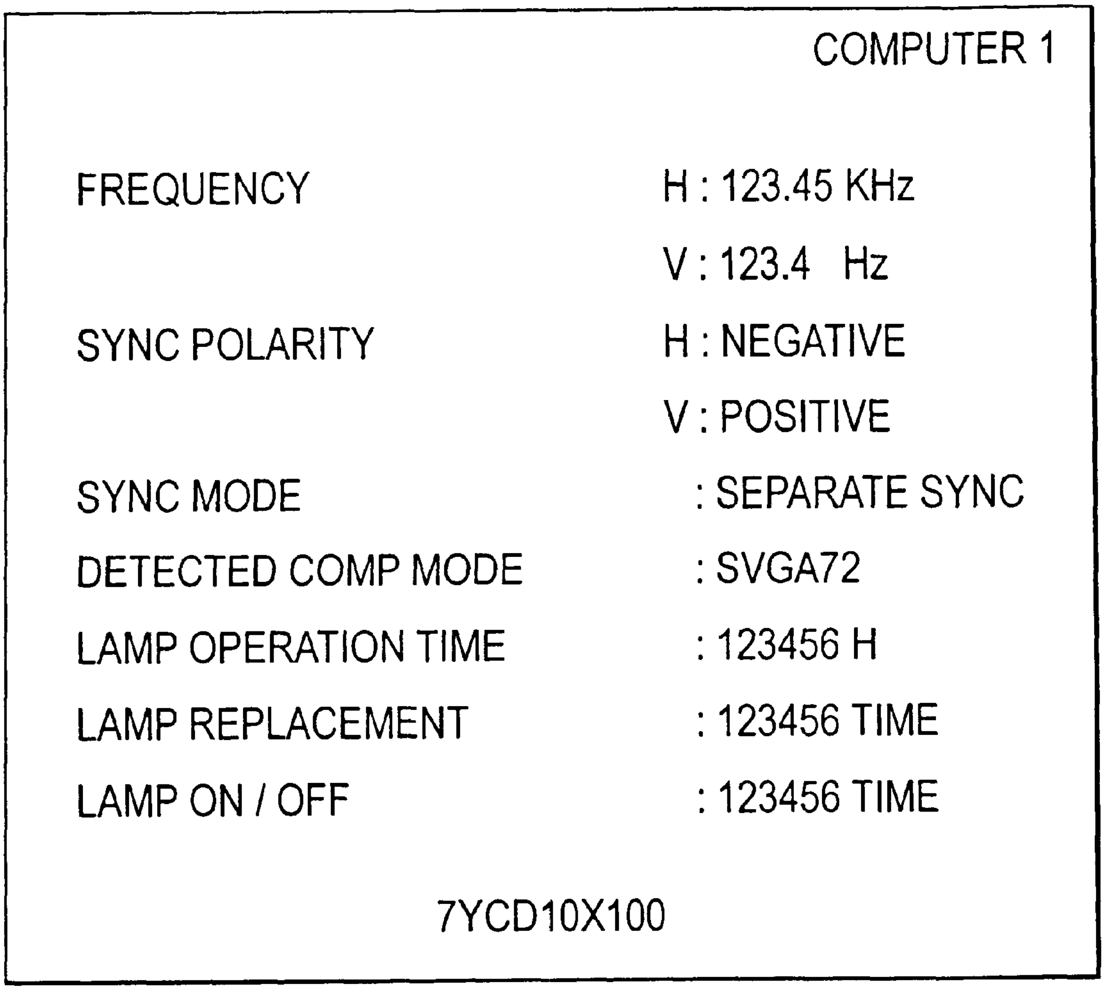
FIG. 2 is a drawing showing an example of a signal information display screen by the image display apparatus in the embodiment.

The signal information processing system 23 is a system for displaying the signal information, detected by the signal information detection means 13 described above, on a predetermined format. Concretely, if an image signal is the RGB signal S1, as shown in FIG. 2, the signal information processing system 23 is constructed so that the signal information processing system 23 may sequentially display Frequency, Sync Polarity, Sync Mode, and Detected Comp Mode (resolution and a refresh rate) of the RGB signal S1.

Figure 3:
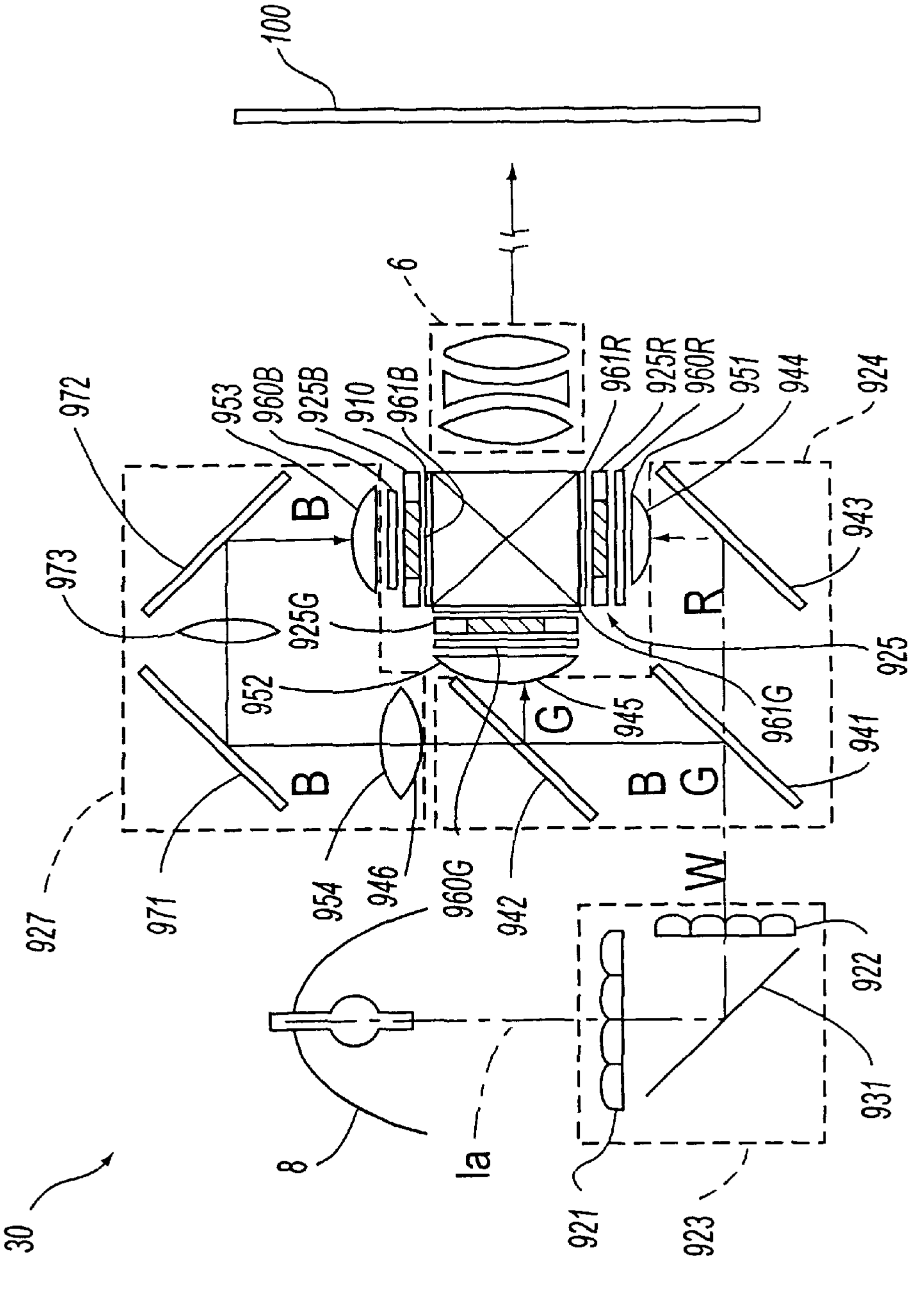
FIG. 3 is a schematic diagram showing the structure of an image display unit in the embodiment.

The image display unit 30 is constructed with including an optical modulation system 925 (described later) modulating a light beam, emitted from a light source lamp, according to a image signal, the light source lamp 8 that is a projection lamp projecting the modulated beam, modulated by this optical modulation system 925, on a projection screen under magnification, and, as shown in FIG. 3, has a reflector, an illumination optical system 923 uniforming the in-plane luminance distribution of the light beam W from the light source lamp unit 8, a color separation optical system 924 separating the light beam W from this illumination optical system 923 into red R, green G, and blue B, the optical modulation system 925 modulating respective color light beams R, G, and B according to image information, and a prism unit 910 that is a color mixing optical system and mixes respective color light beams after modulation.

The illumination optical system 923 comprises a reflector 931 deflecting an optical axis 1*a* of the light beam W emitted from the light source lamp 8, and a first lens plate 921 and a second lens plate 922 that are located with sandwiching this reflector 931

The first lens plate 921 has a plurality of rectangular lenses located in a matrix state, divides a light beam emitted from a light source into a plurality of partial light beams, and converges respective partial light beams in the vicinity of the second lens plate 922.

The second lens plate 922 has a plurality of rectangular lenses located in a matrix state, and has a function of superimposing respective partial light beams emitted from the first lens plate 921 on light valves 925R, 925G, and 925B (described later) constructing the optical modulation system 925.

In this manner, the projection display apparatus according to this embodiment can illuminate the liquid crystal light valves 925R, 925G, and 925B with light having almost uniform luminance by the illumination optical system 923. Therefore, it is possible to obtain a projection image not having nonuniformity of luminance.

The color separation system 924 is composed of a blue and green reflection dichroic mirror 941, a green reflection dichroic mirror 942, and a reflector 943. First, a blue light beam B and a green light beam G that are included in the light beam W emitted from the illumination optical system 923 are reflected by the blue and green reflection dichroic mirror 941, and head toward the green reflection dichroic mirror 942.

A red light beam R passes through this blue and green reflection dichroic mirror 941, and is reflected by the reflector 943 thereafter to be emitted from an outgoing part 944 toward the prism unit 910. Next, the green light beam G between the blue light beam B and green light beam G that are reflected by the blue and green reflection dichroic mirror 941 is reflected by the green reflection dichroic mirror 942, and is emitted from an outgoing part 945 of the green light beam G toward the color mixing optical system. The blue light beam B passing through this green reflection dichroic mirror 942 is emitted from an outgoing part 946 of the blue light beam B toward a light guide system 927. In this example, lengths from an outgoing part of the light beam W in the illumination optical system 923 to the outgoing parts 944, 945 and 946 of respective color light beams in the color separation system 924 are set to be equal to each other.

Respective condenser lenses 951 and 952 are located in outgoing sides of the outgoing parts 944 and 945 of the red and green light beams R and G in the color separation system 924. Therefore, the red and green light beams R and G outgoing from respective outgoing parts enter into condenser lenses 951 and 952 to be paralleled.

The red and green light beams R and G, which are paralleled in this manner, pass through incident polarizing plates 960R and 960G, and enters into the liquid crystal light valves 925R and 925G to be modulated. On the other hand, the blue light beam B is guided to the liquid crystal light valve 925B corresponding to the blue light beam B through the light guide system 927 to be modulated similarly.

The liquid crystal light valves 925R, 925G, and 925B are active matrix liquid crystal panels using p-Si-TFTs as switching elements, and, comprise data drivers and scan drivers so as to drive pixels of respective liquid crystal light valves 925R, 925G, and 925B although these drivers are omitted in FIG. 3.

The light guide system 927 comprises a condenser lens 954 located in the outgoing side of the outgoing part 946 of the blue light beam B, an incident reflector 971, an outgoing reflector 972, an intermediate lens 973 located between these reflectors, and a condenser lens 953 located before the liquid crystal light valve 925B. Therefore, the blue light beam B outgoing from the condenser lens 953 passes through the incident polarizing plate 960B, and enters into the liquid crystal light valve 925B to be modulated. Regarding optical path lengths of respective color light beams, that is, lengths from the light source lamp 8 to respective liquid crystal panels, the blue light beam B is the longest, and hence luminous energy loss of this light beam is the largest. Nevertheless, by making the light guide system 927 intervene, the luminous energy loss can be suppressed.

Then, respective color light beams R, G, and B demodulated through respective liquid crystal light valves 925R, 925G, and 925B are poured to the prism unit 910 through the outgoing polarizing plates 961R, 961G, and 961B to be synthesized here. Furthermore, a color image synthesized by this prism unit 910 is projected through a projection lens unit 6 on a projection screen 100 in a predetermined location under magnification.

Next, display operation of the image display apparatus 1, which is described above, at the time of the RGB signal S1 being input from a computer will be described.

① After a computer is connected to the RGB terminal 11 of the image display apparatus 1, the computer and image display apparatus 1 are activated.

② When the image display apparatus 1 is activated, the mode judgment of the RGB signal S1 input is automatically started. Concretely, the PC signal information detection means 131 detects the resolution, refresh rate, sync polarity, sync mode, and frequencies as the signal information from the RGB signal S1, which is amplified and A/D-converted by the RGB signal processing system 21, and outputs the signal information with the judgment result of the decision means 15 to the signal information processing system 23 to display the signal information on the projection screen 100 on the basis of a format shown in FIG. 2.

③ Here, in case of the RGB signal S1, respective items of the signal information are displayed on the basis of the following rules. In addition, in screen display in FIG. 2, lamp operation time, lamp replacement time, and lamp ON/OFF are displayed besides the signal information described below.

(1) Resolution and refresh rate

Resolution is displayed in a display format according to an OS (Operation System) such as VGA, SVGA, XGA, and SXGA in an IBM PC-compatible computer and Mac13, and Mac16 in a Macintosh system. A refresh rate is numerically displayed in units of Hz subsequently to the resolution display.

(2) Sync polarity

As for sync polarity, any one of "Positive" and "negative" is displayed for the horizontal (H) and vertical (V) respectively.

(3) Sync mode

As for a sync mode, any one of "Separate Sync", "Composite Sync", and "Syncon-green" is displayed.

(4) H/V frequencies

Horizontal (H) and vertical (V) synchronization signals are displayed. Nevertheless, if an image signal is input from a computer, that is, a picture is input, the frequencies of synchronization signals of the image signal are displayed.

On the other hand, if an image signal is not present, that is, a picture is not input, "H:---.---kHz V:---.---Hz" is displayed on the screen. Furthermore, if a frequency counter overflows, "H:999.99 kHz V:999.99 Hz" is displayed on the screen.

(5) Result of comparative judgment

If the signal information, described above, has a value which is not supported in the image display apparatus 1, the decision means 15 judges that the RGB signal S1 is not suitable to the image display apparatus 1, and a message, "The input from the computer is not suitable to the image display apparatus. Change the image signal setting of the computer." is displayed. In addition, information from item (1) to item (5) is displayed on the display of the computer.

④ If the RGB signal S1 is out of synchronization with the image display apparatus 1, an adequate optical image is formed on the projection screen 100 by performing automatic picture adjustment in the image display apparatus 1 so as to set Tracking, Sync, and Position at adequate values.

⑤ In addition, such mode judgment and automatic picture adjustment of an image signal is automatically performed not only at the time of startup of the image display apparatus 1 but also at the time of switching from a computer to a video tape recorder, switching between a plurality of computers, and the like. Furthermore, the setting before switching is stored in SRAM, which is provided in the signal processing unit 20 and is not shown. For example, if switching operation, Machine I→Machine II→Machine I is performed in the computer, the setting of the last Machine I in the SRAM can be used as it is, and hence it is possible to omit tracking adjustment in the automatic picture adjustment.

⑥ On the other hand, if the image signal is the composite signal S2 input from the video input terminal 12, the television system of the composite signal S2 is displayed by the video signal information detection means 132, but the sync polarity, sync mode, and H/V frequencies are not displayed like the case of RGB signal S1 described above. In addition, when the television system is displayed, concretely, characters such as NTSC, PAL, and SECAM are displayed on the screen.

According to the embodiment described above, following effects can be obtained.

① Since the image display apparatus 1 comprises the PC signal information detection means 131 and signal information output means 14, it is possible to easily confirm whether the RGB signal S1 is suitable to the setting of the image display unit 30 by detecting the signal information of the RGB signal S1 input, and performing output display on the image display unit 30.

② In addition, since the signal information includes the resolution of the RGB signal S1 and information on this resolution is displayed on the image display unit 30 by the signal information output means 14, it is possible to immediately confirm whether the resolution of the RGB signal S1 is suitable to the setting of the image display apparatus 1 and to dissolve such a state that an RGB signal having unnecessarily high resolution is output form the computer.

③ Furthermore, since the image display apparatus 1 comprises the decision means 15, it is possible to automatically judge whether the RGB signal S1 is suitable to the setting of the image display unit 30 and to perform image display of its result with the signal information. Therefore, it is possible to further easily confirm the suitability of the image signal.

④ Moreover, since the signal information, which is described above, is displayed on the image display unit 30 and a display of the computer, it is possible to confirm at the same time of startup of the image display apparatus whether the RGB signal S1 is suitable to the setting of the image display unit 30, and further to display the signal information on the display of the computer. Therefore, also, if the setting of the RGB signal S1 is changed, suitability can be easily confirmed.

In addition, the present invention is not limited to the embodiment described above, but includes also the following modifications.

Figure 4:
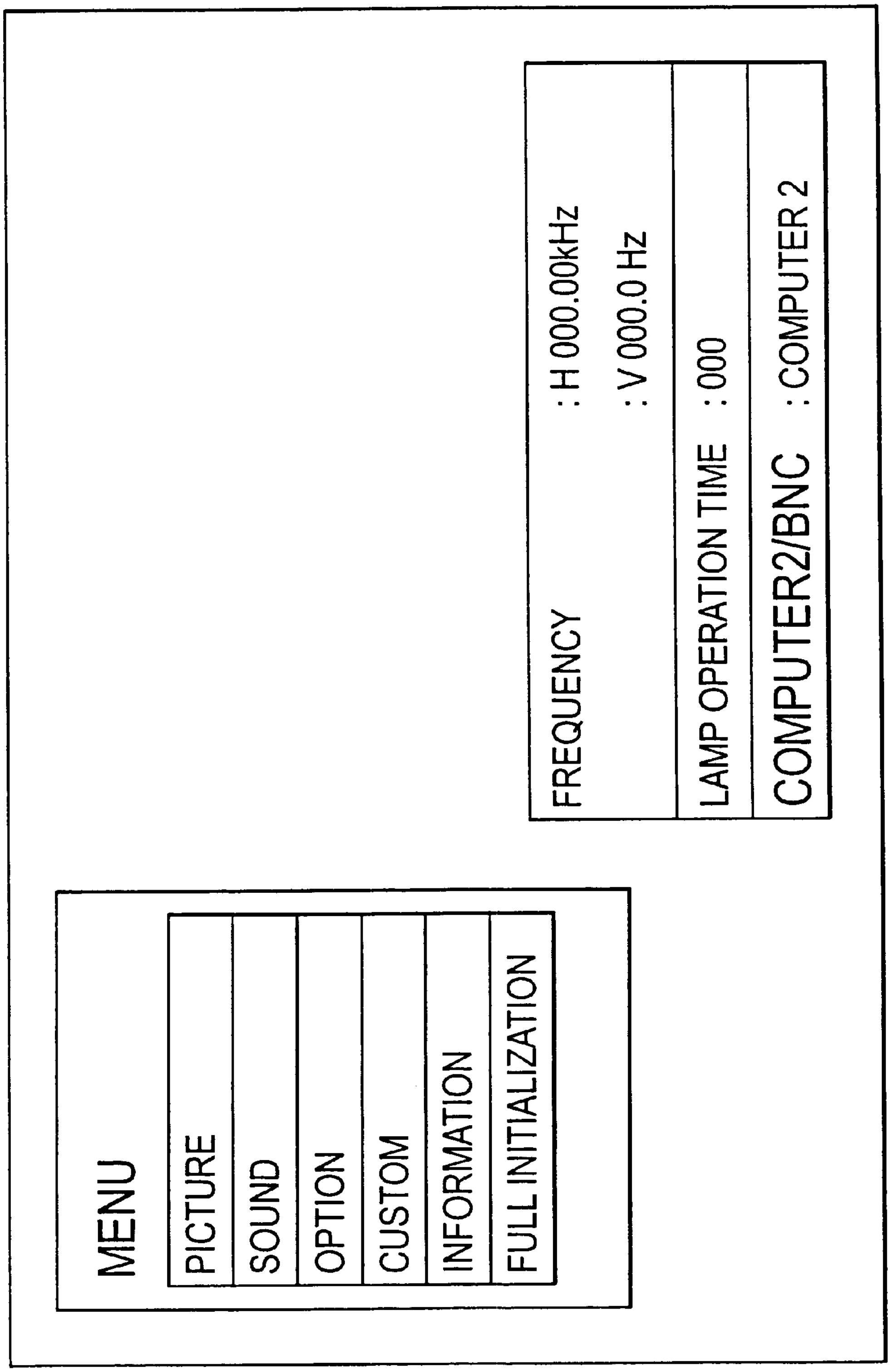
FIG. 4 is a drawing showing an example of a signal information display screen that is a modification of the example in FIG. 2.

Thus, although, in the embodiment described above, the signal information displayed on the image display unit is the display of the signal information based on English, the present invention is not limited to this, but, for example, like screen display shown in FIG. 4, the display of the signal information based on Japanese can be performed. Furthermore, it can be performed to comprises both of these display functions and to select any one of display languages by switching with a switch.

In addition, although, in the embodiment described above, the present invention is used in the projection image display apparatus 1, the present invention is not limited to this, but the present invention can be applied also to a large image display apparatus such as a plasma display (PDP), and an image display apparatus such as a head-mounted display.

Furthermore, in the embodiment described above, the present invention is applied to the image display unit 30 comprising the optical modulation system 925 composed of active matrix liquid crystal light valves 925R, 925G, and 925B using p-Si-TFTs as switching elements. Nevertheless, the present invention can be applied to optical modulation systems having other structure. For example, even if the image display apparatus is an image display apparatus comprising DMD (Deformable Mirror Display: "Electronic Display", Ohm Co., Ltd., pp. 291–292) or SSLM (Solid State Light Modulator) optical modulation means or an image display means using self-emission type elements such as EL (Electro Luminescence) elements, effects similar to those in the embodiment described above can be enjoyed.

In addition, although, in the embodiment described above, the RGB signal information detection means 131 detects only the resolution, refresh rate, sync polarity, sync mode, and frequencies as the signal information of the RGB signal SI, the information on the number of colors also can be detected and displayed in addition to this information.

Others, that is, concrete structure and shapes at the time of implementation of the present invention can be other ones within the range where the object of the present invention can be achieved.

What is claimed is:

1. An image display apparatus, comprising:

an image input unit that inputs an image signal;

an image display unit that forms an optical image on the basis of the image signal input from the image input unit;

a signal identifying information detector that detects signal identifying information including characteristic properties of the input signal;

a signal identifying information output unit that outputs signal identifying information detected by the signal identifying information detector; and a signal identifying information processing unit that receives the signal identifying information from the signal identifying information output unit and displays the received signal identifying information through the image display unit.

2. The image display apparatus according to claim 1, the input image signal being a composite signal output from video equipment, such as a video camera.

3. The image display apparatus according to claim 2, the signal information of the input image signal including information concerning the input image signal's television system.

4. The image display apparatus according to claim 1, the input image signal being an image signal output from a computer.

5. The image display apparatus according to claim 4, the signal information of the input image signal including a resolution of the input image signal.

6. The image display apparatus according to claim 5, the signal information including information on the number of colors of the input image signal.

7. The image display apparatus according to claim 5, further comprising:

a determination unit that compares the signal information of the image display unit with the signal information of the input image signal, and determines setting information.

8. The image display apparatus according to claim 7, the signal information output unit outputting a result of the comparison by the determination unit with the signal information.

9. The image display apparatus according to claim 6, further comprising:

a determination unit that compares the signal information of the image display unit with the signal information of the input image signal, and determines setting information.

10. The image display apparatus according to claim 9, the signal information output unit outputting a result of the comparison by the determination unit with the signal information.

11. The image display apparatus according to claim 8, the signal information output unit outputting at least one of the result of the comparison and the signal information to another device connected to the image display apparatus.

12. The image display apparatus according to claim 10, the signal information output unit outputting at least one of the result of the comparison and the signal information to another device connected to the image display apparatus.

13. The image display apparatus according to claim 11, wherein the another device is one of a computer and an image display unit.

14. The image display apparatus according to claim 12, wherein the another device is one of a computer and an image display unit.

15. The image display apparatus according to claim 1, the image display unit comprising an optical modulation system modulating a light beam, emitted from a light source lamp, according to the image signal, and a projection lens projecting the light beam, which is modulated by the optical modulation system, under magnification.

16. A method of operating an image display apparatus, comprising:

inputting an image signal using an image input unit;

forming an optical image on the basis of the image signal input using an image display unit;

detecting signal identifying information including characteristic properties of the input image signal;

outputting the detected signal identifying information; and receiving the outputted signal identifying information and displaying the received signal identifying information through the image display unit.

17. The method according to claim 16, the input image signal being a composite signal output from video equipment, such as a video camera.

18. The method according to claim 17, the signal information of the input image signal including information concerning the input image signal's television system.

19. The method according to claim 16, the input image signal being an image signal output from a computer.

20. The method according to claim 19, the signal information of the input image signal including a resolution of the input image signal.

21. The method according to claim 20, the signal information including information on the number of colors of the input image signal.

22. The method according to claim 20, further comprising:

comparing the signal information of the image display unit with the signal information of the input image signal, and determines setting information.

23. The method according to claim 22, the outputting step including outputting a result of the comparison step.

24. The method according to claim 21, further comprising:

comparing the signal information of the image display unit with the signal information of the input image signal, and determines setting information.

25. The method according to claim 24, the outputting step including outputting a result of the comparison step.

26. The method according to claim 23, the outputting step including outputting at least one of a result of the comparison step and the signal information to another device connected to the image display apparatus.

27. The method according to claim 25, the outputting step including outputting at least one of a result of the comparison step and the signal information to another device connected to the image display apparatus.

28. The method according to claim 26, wherein the another device is one of a computer and an image display unit.

29. The method according to claim 27, wherein the another device is one of a computer and an image display unit.

30. The method according to claim 16, the forming step including modulating a light beam using an optical modulation system, emitted from a light source lamp, according to the image signal, and projecting the light beam using a projection lens, which is modulated by the optical modulation system, under magnification.

* * * * *